(12) United States Patent
Kang et al.

(10) Patent No.: US 10,159,059 B2
(45) Date of Patent: Dec. 18, 2018

(54) SYSTEM AND METHOD FOR TRANSMITTING AND RECEIVING A SIGNAL USING MULTIPLE FREQUENCY BANDS IN A WIRELESS COMMUNICATION SYSTEM

(71) Applicant: Samsung Electronics Co., Ltd, Gyeonggi-do (KR)

(72) Inventors: Hyun-Jeong Kang, Seoul (KR); Won-Il Roh, Yongin-si (KR); Jae-Hee Cho, Seoul (KR); Jung-Je Son, Yongin-si (KR); Byung-Wook Jun, Seoul (KR); Sung-Jin Lee, Seoul (KR); Jae-Hyuk Jang, Suwon-si (KR); Young-Bin Chang, Anyang-si (KR); Chang-Yoon Oh, Yongin-si (KR); Yeong-Moon Son, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/929,247

(22) Filed: Jun. 27, 2013

(65) Prior Publication Data

US 2013/0288683 A1 Oct. 31, 2013

Related U.S. Application Data

(63) Continuation of application No. 12/380,621, filed on Mar. 2, 2009, now Pat. No. 8,521,166.

(30) Foreign Application Priority Data

| Mar. 3, 2008 | (KR) | 10-2008-0019704 |
| Apr. 28, 2008 | (KR) | 10-2008-0039538 |

(Continued)

(51) Int. Cl.
*H04W 72/04* (2009.01)
*H04W 36/06* (2009.01)
(Continued)

(52) U.S. Cl.
CPC .......... *H04W 72/04* (2013.01); *H04W 36/06* (2013.01); *H04W 48/16* (2013.01); *H04W 76/10* (2018.02)

(58) Field of Classification Search
CPC ...... H04W 28/04; H04W 36/06; H04W 48/16
(Continued)

(56) References Cited

U.S. PATENT DOCUMENTS

| 5,960,354 A | * | 9/1999 | Einola | 455/454 |
| 6,574,456 B2 | * | 6/2003 | Hamabe | H04W 72/082 |
| | | | | 370/331 |

(Continued)

FOREIGN PATENT DOCUMENTS

| CN | 1707986 | 12/2005 |
| CN | 101116363 | 1/2008 |

(Continued)

OTHER PUBLICATIONS

Chinese Office Action dated Aug. 23, 2013 in connection with Chinese Application No. 200980107569.5, 9 pages.

(Continued)

*Primary Examiner* — Qun Shen

(57) ABSTRACT

Disclosed is a system and a method of signal transmission/reception by a mobile station in a wireless communication system. The method includes: transmitting a first sub-band preparation indicator, which indicates that the mobile station has been prepared for transmission/reception of a signal through a first sub-band, to a base station through a primary band; transmitting a first sub-band failure indicator to the base station through the primary band upon detecting failure (Continued)

in transmitting the first sub-band preparation indicator; receiving sub-band information on a second sub-band, which is different from the first sub-band, from the BS through the primary band; and acquiring synchronization with the second sub-band, so as to enable transmission/reception of a signal through the second sub-band based on the sub-band information.

16 Claims, 13 Drawing Sheets

(30) Foreign Application Priority Data

Jul. 7, 2008 (KR) .................. 10-2008-0065743
Oct. 16, 2008 (KR) .................. 10-2008-0101780

(51) Int. Cl.
*H04W 76/10* (2018.01)
*H04W 48/16* (2009.01)

(58) Field of Classification Search
USPC ......... 455/450, 436, 437, 133; 370/208, 338
See application file for complete search history.

(56) References Cited

U.S. PATENT DOCUMENTS

| | | | |
|---|---|---|---|
| 7,477,900 B2* | 1/2009 | Gorsuch et al. ........... | 455/452.1 |
| 7,502,596 B2 | 3/2009 | Takao et al. | |
| 7,684,807 B2 | 3/2010 | Schmidt | |
| 7,865,192 B2 | 1/2011 | Fukumoto et al. | |
| 2002/0197998 A1* | 12/2002 | Schmidt ........................ | 455/452 |
| 2004/0029596 A1* | 2/2004 | Kim ...................... | H04L 12/189 |
| | | | 455/458 |
| 2004/0052230 A1 | 3/2004 | Soliman | |
| 2004/0174845 A1 | 9/2004 | Koo et al. | |
| 2005/0197133 A1* | 9/2005 | Hong .................... | H04W 36/06 |
| | | | 455/450 |
| 2005/0233715 A1* | 10/2005 | Laroia .................... | H04B 1/005 |
| | | | 455/133 |
| 2005/0265298 A1 | 12/2005 | Adachi et al. | |
| 2006/0009230 A1 | 1/2006 | Fukumoto et al. | |
| 2006/0176861 A1 | 8/2006 | Schmidt | |
| 2006/0194598 A1* | 8/2006 | Kim et al. .................... | 455/509 |
| 2007/0010251 A1 | 1/2007 | Cho et al. | |
| 2007/0064589 A1 | 3/2007 | Fruhauf et al. | |
| 2007/0155323 A1 | 7/2007 | Matsumoto et al. | |
| 2008/0009283 A1 | 1/2008 | Lim et al. | |
| 2008/0137582 A1* | 6/2008 | Kim ........................ | H04L 45/00 |
| | | | 370/315 |
| 2008/0242340 A1 | 10/2008 | Kang et al. | |
| 2009/0029710 A1* | 1/2009 | Ochiai et al. ................. | 455/450 |
| 2009/0168738 A1* | 7/2009 | Trainin .................. | H04W 16/14 |
| | | | 370/342 |
| 2009/0219909 A1* | 9/2009 | Ko et al. ........................ | 370/343 |
| 2013/0250922 A1 | 9/2013 | Kwon et al. | |

FOREIGN PATENT DOCUMENTS

| | | |
|---|---|---|
| EP | 1469697 A2 | 10/2004 |
| JP | 2003-143651 | 5/2003 |
| JP | 2005-354537 | 12/2005 |
| KR | 10-2002-0087873 | 11/2002 |
| KR | 10-2005-0089685 | 9/2005 |
| KR | 1020070077022 A | 7/2007 |
| RU | 2233546 C2 | 7/2004 |
| RU | 2292669 C2 | 1/2007 |
| WO | WO 2006/088082 A1 | 8/2006 |
| WO | WO 2007/058490 A1 | 5/2007 |

OTHER PUBLICATIONS

Korean Office Action dated Jul. 15, 2014 in connection with Korean Application No. 10-2008-0101780, 12 pages.
Result of Substantive Examination dated Mar. 11, 2015 in connection with Vietnamese Patent Application No. 1-2010-02602; 4 pages.
Examination Report dated Feb. 6, 2017 in connection with Indian Application No. 3661/KOLNP/2010, 8 pages.
Extended European Search Report dated Jun. 16, 2016 in connection with European Application No. 09716991.6, 8 pages.
Itzik Shahar, et al., "Optimized Handover Clarifications", Nov. 15, 2006, IEEE 802.16 Broadband Wireless Access Working Group, 31 pages.
Notification of Transmittal of the International Search Report and the Written Opinion of the International Searching Authority, or the Declaration dated Jun. 23, 2009 in connection with PCT Application No. PCT/KR2009/001005.
Communication from a foreign patent office in a counterpart foreign application, European Patent Office, "Communication pursuant to Article 94(3) EPC," Application No. EP 09716991.6, dated Jul. 10, 2018, 8 pages.

* cited by examiner

SYSTEM AND METHOD FOR TRANSMITTING AND RECEIVING A SIGNAL USING MULTIPLE FREQUENCY BANDS IN A WIRELESS COMMUNICATION SYSTEM

CROSS-REFERENCE TO RELATED APPLICATION(S) AND CLAIM OF PRIORITY

This application incorporates by reference U.S. patent application Ser. No. 12/380,621 filed Mar. 2, 2009 and claims the priority under 35 U.S.C. § 119(a) of applications entitled "System And Method For Transmitting And Receiving A Signal Using Multiple Frequency Bands In A Wireless Communication System" filed in the Korean Industrial Property Office on Mar. 3, 2008 and assigned Korean Patent Application Serial No. 10-2008-0019704 filed on Mar. 3, 2008, Korean Patent Application Serial No. 10-2008-0039538 filed Apr. 28, 2008, Korean Patent Application Serial No. 10-2008-0065743 filed Jul. 7, 2008, and Korean Patent Application Serial No. 10-2008-0101780 filed Oct. 16, 2008.

TECHNICAL FIELD OF THE INVENTION

The present invention relates to a wireless communication system, and more particularly to a wireless communication system for transmitting and receiving a signal using multiple frequency bands and a method for supporting the wireless communication system.

BACKGROUND OF THE INVENTION

With the development of wireless communication systems, wireless communication systems are required to provide a wider variety of types and a larger quantity of services. In order to satisfy such a requirement, a broadband wireless communication system has appeared. Meanwhile, since a wireless communication system has a limited quantity of frequency resources, the broadband wireless communication system also has limited available frequency bands. Therefore, in order to provide a broadband service, it is necessary to increase available frequency bands.

FIG. 1 schematically illustrates a structure supporting a single frequency band and a structure supporting two frequency bands.

As a presumption before describing FIG. 1, a Base Station (BS) in a wireless communication system, especially in a broadband wireless communication system represented by an Institute of Electrical and Electronics Engineers (IEEE) 802.16 system, operates a single Frequency Assignment (FA) or at least two FAs. Further, the BS provides a wireless communication service to a Mobile Station (MS) through an FA operated by the BS itself.

Referring to FIG. 1, an MS 100 may move from an FA1 area 120 to an FA2 area 140. Here, the FA1 area 120 refers to a service area in which the MS 100 receives a wireless communication service using FA1, and the FA2 area 140 refers to a service area in which the MS 100 receives a wireless communication service using FA2.

At this time, when the MS 100 located within the FA1 area 120 can operate only one FA or when FA1 and FA2 are operated by different BSs, the MS 100 performs a handover between FA1 and FA2 and then receives a wireless communication service through FA2.

In contrast, when the MS 150 can operate at least two FAs or when at least two FAs are operated by a single BS, the MS 150 can receive a wireless communication service in both the FA1 area 160 and the FA2 area 180. The signal transmission and reception between the MS and the BS using multiple frequency bands as described above is advantageous in transmitting and receiving high speed and large capacity data.

However, there has been no procedure promised between an MS and a BS in order to use multiple frequency bands. Further, there has been no supporting scheme for enabling data transmission/reception through a second sub-band when an MS and a BS have failed in transmitting and receiving a first sub-band preparation indicator indicating that the MS and the BS have been completely prepared to transmit and receive data through the first sub-band. Moreover, there has been no scheme for notifying a BS that an MS can transmit and receive data using multiple frequency bands.

SUMMARY OF THE INVENTION

To address the above-discussed deficiencies of the prior art, it is a primary object of the present invention to solve the above-mentioned problems occurring in the prior art, and the present invention provides a wireless communication system for transmitting and receiving a signal using multiple frequency bands and a method supporting the same.

Also, the present invention provides a wireless communication system using multiple frequency bands, which transmits and receives a signal by using a primary band and a sub-band, and a method supporting the same.

Also, the present invention provides a wireless communication system using multiple frequency bands, which transmits and receives a signal by using a sub-band in a good access state, and a method supporting the same.

Also, the present invention provides a wireless communication system using multiple frequency bands and a method supporting the same, in which, when a mobile station and a base station fail in transmitting/receiving a first sub-band preparation indicator, they can transmit/receive data through a second sub-band different from the first sub-band.

Also, the present invention provides a wireless communication system using multiple frequency bands and a method supporting the same, in which a mobile station can notify a base station that the mobile station can transmit/receive data through a primary band and at least one sub-band.

In accordance with an aspect of the present invention, there is provided a signal transmission/reception system in a wireless communication system, the signal transmission/reception system including: a base station; and a mobile station for transmitting a first sub-band preparation indicator, which indicates that the mobile station has been prepared for transmission/reception of a signal through a first sub-band, to a base station through a primary band, transmitting a first sub-band failure indicator to the base station through the primary band upon detecting failure in transmitting the first sub-band preparation indicator, receiving sub-band information on a second sub-band, which is different from the first sub-band, from the BS through the primary band; and acquiring synchronization with the second sub-band, so as to enable transmission/reception of a signal through the second sub-band based on the sub-band information.

In accordance with another embodiment of the present invention, there is provided a signal transmission/reception system in a wireless communication system, the signal transmission/reception system including: a mobile station;

and a base station, wherein the mobile station enters a network through a primary band, acquires synchronization with at least one sub-band different from the primary band, and transmits an overlay mode preparation indicator, which indicates that the mobile station has prepared for data transmission/reception through the at least one sub-band, to the base station, and the mobile station and the base station transmit and receive a signal through the at least one sub-band in response to the overlay mode preparation indicator.

In accordance with another aspect of the present invention, there is provided a method of signal transmission/reception by a mobile station in a wireless communication system, the method including the steps of: transmitting a first sub-band preparation indicator, which indicates that the mobile station has been prepared for transmission/reception of a signal through a first sub-band, to a base station through a primary band; transmitting a first sub-band failure indicator to the base station through the primary band upon detecting failure in transmitting the first sub-band preparation indicator; receiving sub-band information on a second sub-band, which is different from the first sub-band, from the BS through the primary band; and acquiring synchronization with the second sub-band, so as to enable transmission/reception of a signal through the second sub-band based on the sub-band information.

In accordance with another aspect of the present invention, there is provided a method of signal transmission/reception between a mobile station and a base station in a wireless communication system, the method including the steps of: entering a network through a primary band and acquiring synchronization with at least one sub-band different from the primary band by a mobile station; transmitting an overlay mode preparation indicator, which indicates that the mobile station has prepared for data transmission/reception through the at least one sub-band, to the base station; and transmitting and receiving a signal through the at least one sub-band by the mobile station and the base station in response to the overlay mode preparation indicator.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, exemplary embodiments of the present invention will be described with reference to the accompanying drawings. In the following description, a detailed description of known functions and configurations incorporated herein will be omitted when it may make the subject matter of the present invention rather unclear.

The following description of exemplary embodiments of the present invention discusses in detail a wireless communication system and a method for supporting data transmission/reception between an MS and a BS using multiple frequency bands.

Further, the following description of exemplary embodiments of the present invention discusses in detail a wireless communication system and a method using multiple frequency bands, which enable data transmission/reception through a second sub-band when an MS and a BS have failed in transmitting and receiving a first sub-band preparation indicator indicating that the MS and the BS have been completely prepared to transmit and receive data through the first sub-band.

Further, the following description of exemplary embodiments of the present invention discusses in detail a wireless communication system and a method using multiple frequency bands, which can notify a BS that an MS can transmit and receive data using multiple frequency bands. As used herein, the frequency band may be a Frequency Assignment (FA).

In the following description of embodiments of the present invention, a mode in which an MS and a BS transmit and receive a signal by using multiple frequency bands is referred to as an "overlay mode." Further, a wireless communication system operation in the overlay mode is referred to as an "overlay communication system." For convenience of description, a wireless communication system (IEEE 802.16 communication system) using the IEEE 802.16 standard is employed as an example of the wireless communication system in the following description on a system and a method of transmitting and receiving a signal by the overlay communication system. However, the system and method of transmitting and receiving a signal by the overlay communication system proposed by the present invention can be commonly applied to all wireless communication systems using multiple frequency bands. That is, it is natural that a signal transmission/reception scheme proposed by the present invention can be applied to all other communication systems, such as a Mobile WiMAX system, as well as the IEEE 802.16 communication system.

Figure 1:
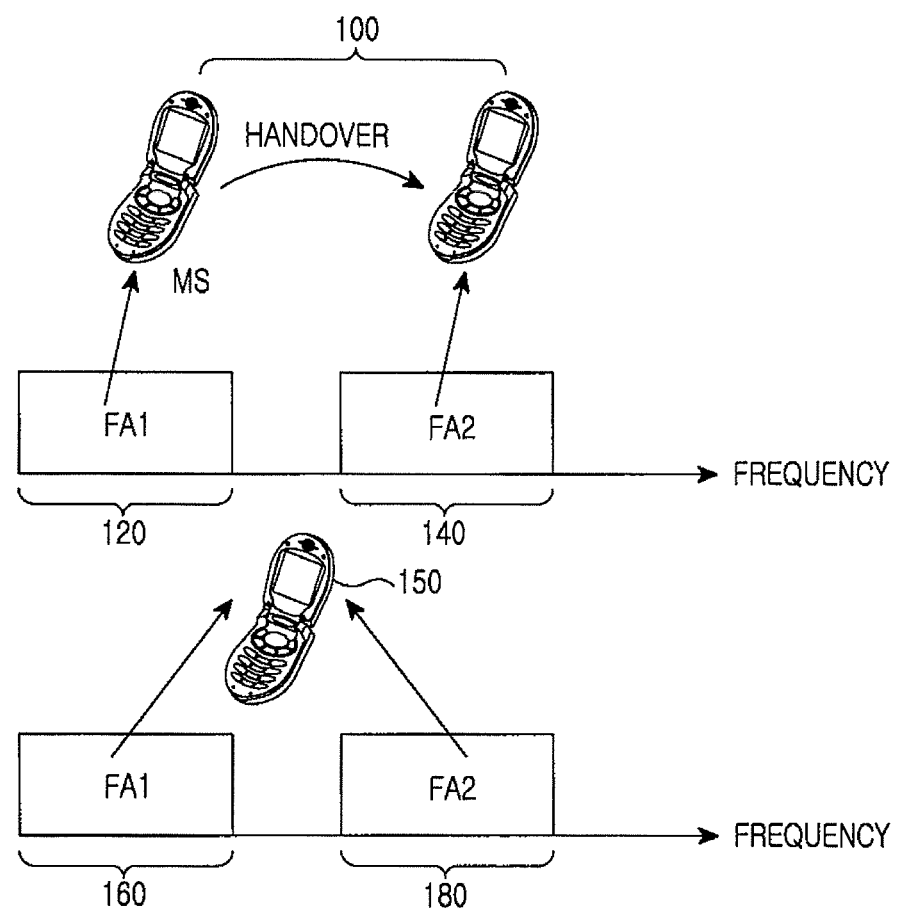
FIG. 1 schematically illustrates a structure supporting a single frequency band and a structure supporting two frequency bands.
Figure 2:
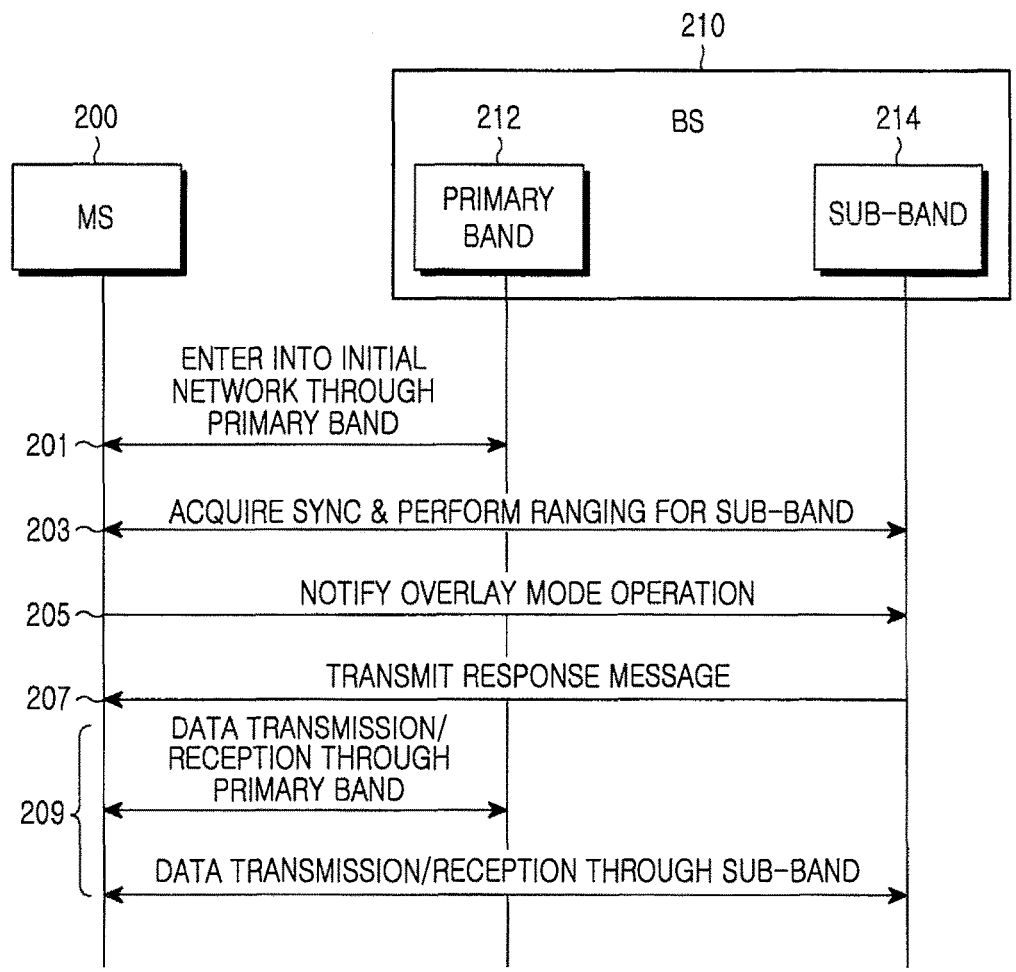
FIG. 2 illustrates a data transmission/reception process between an MS and a BS in an overlay communication system according to an embodiment of the present invention.

FIG. 2 illustrates a data transmission/reception process between an MS and a BS in an overlay communication system according to an embodiment of the present invention.

The overlay communication system includes an MS 200 and a BS 210, and the BS 210 operates two frequency bands, which include a primary band (primary FA) 212 and a sub-band (secondary FA) 214. However, it is obvious to one skilled in the art that the data transmission/reception process according to an embodiment of the present invention can be also applied to an overlay communication system operating more than two frequency bands.

Referring to FIG. 2, the MS 200 performs an initial network entry procedure with the BS 210 through the primary band 212, which is a default band (step 201). The initial network entry procedure includes an overlay mode support information exchange step for exchanging information on whether to support the overlay mode, and an overlay mode supporting available sub-band information exchange step for exchanging information on a sub-band 214 usable in order to support the overlay mode.

Information (sub-band information) on the sub-band 214 includes an identifier of the sub-band 214, which may be a frequency band identifier. Further, the sub-band information may be exchanged by using one of a header, a sub-header, and a typical control message, and may contain the information as shown in Table 1 below.

TABLE 1

| Name | Description |
| --- | --- |
| Frequency band index | Frequency band index indicating a predetermined frequency band (when a band class index is 10 MHz, a channel frequency step size: 250 KHz, a frequency range: 2.496~2.69 GHz, a frequency band calculation formula: 2.496 GHz + Frequency band index * 250 KHz) |
| Preamble index | Preamble index of FA |

The MS 200 acquires synchronization for the sub-band 214 by using the sub-band information acquired in step 201 and performs ranging with the BS 210 (in step 203).

The MS 200 sends a notification (overlay mode execution notification) that it will perform the operation in the overlay mode to the BS 210 (in step 205). That is, the MS transmits information (e.g. sub-band readiness indicator) notifying that it has been prepared for data transmission and reception through the sub-band to the BS 210. The sub-band readiness indicator can be transmitted using a bandwidth request header or uplink data.

Upon receiving the overlay mode execution notification, the BS 210 transmits a response message to the MS 200 (step 207). When the sub-band preparation indicator is transmitted using a bandwidth request header, the response message may be a bandwidth allocation message including a bandwidth allocated to the MS 200 by the BS 210 in response to the bandwidth request header. Further, when the sub-band preparation indicator is transmitted using uplink data, the response message may be an acknowledgement (ACK) message indicating that the BS 210 has received the uplink data.

Upon receiving the response message, the MS 200 performs data transmission/reception with the BS 210 though the primary band 212 and the sub-band 214 (in step 209).

Next, step 205 of FIG. 2 will be described in more detail with reference to FIG. 3.

Figure 3:
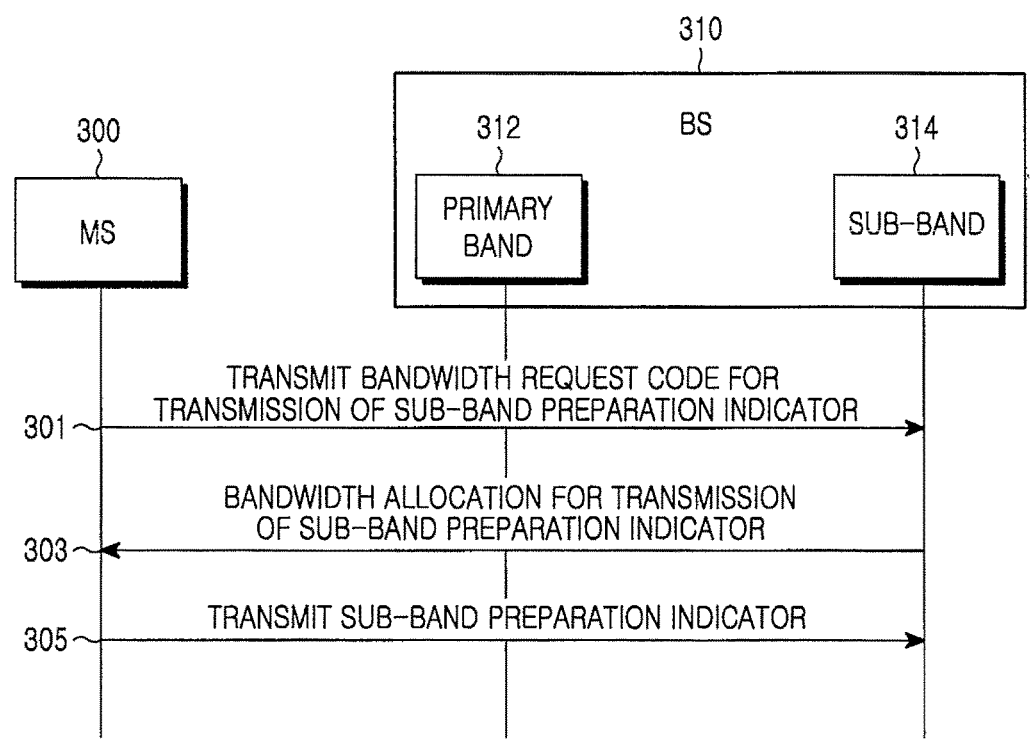
FIG. 3 illustrates a process of notifying overlay mode execution to the BS by the MS in an overlay communication system according to an embodiment of the present invention.

FIG. 3 illustrates a process of notifying overlay mode execution to the BS by the MS in an overlay communication system according to an embodiment of the present invention.

As a presumption before describing FIG. 3, the overlay communication system includes an MS 300 and a BS 310, and the BS 310 operates two frequency bands, which include a primary band 312 and a sub-band 314. However, one skilled in the art would understand that the data transmission/reception process according to an embodiment of the present invention can be also applied to an overlay communication system operating more than two frequency bands.

Referring to FIG. 3, the MS 300 transmits a bandwidth request code requesting bandwidth allocation for transmission of a sub-band preparation indicator to the BS 310 (in step 301). The bandwidth requested to be allocated corresponds to an uplink resource.

Upon receiving the bandwidth request code, the BS 310 allocates a bandwidth for transmission of the sub-band preparation indicator to the MS 300 (in step 303). The MS 300 transmits the sub-band preparation indicator to the BS 310 by using the allocated bandwidth (in step 303). Upon receiving the sub-band preparation indicator, the BS 310 can identify that the MS has been prepared to transmit data by using a sub-band.

However, failure in transmission and reception of the sub-band preparation indicator may often occur. For example, the cases of failure in transmission and reception of the sub-band preparation indicator include a case in which the MS 300 fails in transmitting the sub-band preparation indicator and a case in which the MS 300 has transmitted the sub-band preparation indicator but the BS 310 fails in receiving the sub-band preparation indicator. The reasons why the MS 300 fails in transmitting the sub-band preparation indicator include a case in which the BS 310 fails in receiving the bandwidth request code transmitted by the MS 300 and a case in which the MS 300 fails in receiving the bandwidth allocated by the BS 310.

Most of the cases of failure in transmission and reception of the sub-band preparation indicator occur when the connection to a corresponding sub-band is not in a good state.

Next, schemes for transmission/reception of data by the BS 310 and the MS 300 when they fail in transmission/reception of a sub-band preparation indicator will be described with reference to FIGS. 4 and 5. The embodiments described below corresponds to schemes of supporting of data using another sub-band in the case of failure in transmission/reception of a sub-band preparation indicator through a first sub-band.

Figure 4:
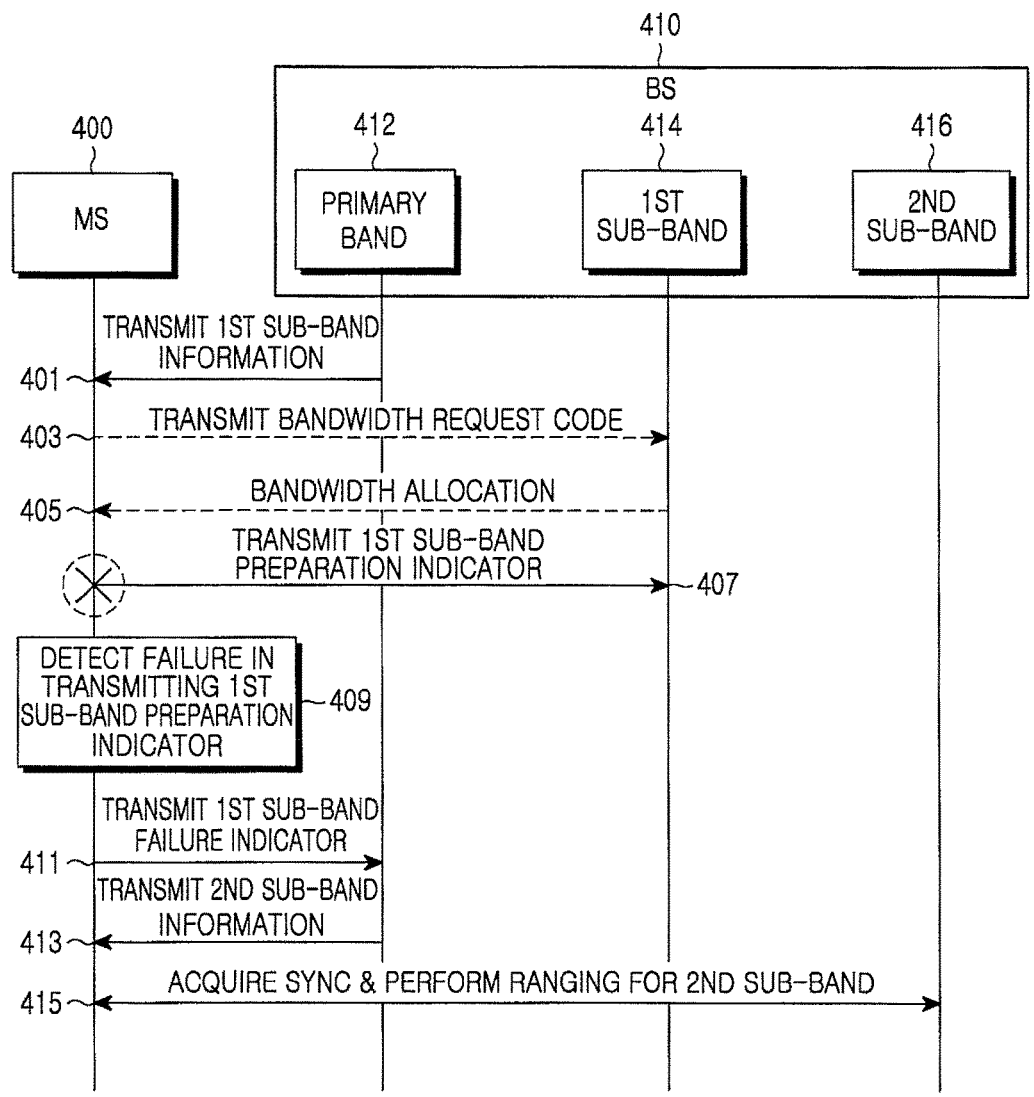
FIG. 4 illustrates a process in an overlay communication system according to an embodiment of the present invention.

FIG. 4 illustrates a process in an overlay communication system according to an embodiment of the present invention. That is, FIG. 4 shows a process of transmitting/receiving a sub-band preparation indicator (the second sub-band preparation indicator) in order to use another sub-band (the second sub-band) when transmission/reception of the first sub-band preparation indicator, in order to use the first sub-band by the MS, fails.

The overlay communication system includes an MS 400 and a BS 410, and the BS 410 operates three frequency bands, which include a primary band 412, a first sub-band 414, and a second sub-band 416. Further, the present embodiment discusses, for example, a case in which the MS 400 fails in transmitting the first sub-band preparation indicator.

Referring to FIG. 4, the BS 410 transmits information (first sub-band information) on the first sub-band through the primary band 412 to the MS 400 (in step 401). Upon receiving the first sub-band information, the MS 400 transmits a bandwidth request code to the BS 410 through the first sub-band 414 (in step 403).

The BS 410 allocates a bandwidth to the MS 400 (in step 405). By using the bandwidth allocated by the BS 410, the MS 400 transmits the first sub-band preparation indicator to the BS 410 (in step 407).

The MS 400 detects the failure in transmitting the first sub-band preparation indicator (in step 409). As described above, the failure in transmitting the first sub-band preparation indicator has three reasons in large, which include a first reason when the BS 410 fails in receiving the bandwidth request code transmitted by the MS 400, a second reason when the MS 400 fails in receiving the allocated bandwidth transmitted by the BS 410, and a third reason when the BS 410 fails in receiving the first sub-band preparation indicator transmitted by the MS 400.

However, since the MS 400 cannot discriminate between the first reason and the second reason, it is possible to consider the two reasons as the same. Therefore, two schemes as follows can be proposed in order to detect the failure in transmitting the first sub-band preparation indicator.

The first scheme detects that the failure in transmitting the first sub-band preparation indicator has been caused by the first reason and the second reason.

Specifically, according to the first scheme, the MS 400 transmits the bandwidth request code to the BS 410 (in step 403) and simultaneously starts a first timer waiting for a response to the bandwidth request. The MS 400 monitors determines if a response to the bandwidth request is received before the first timer expires, that is, before a preset waiting time interval expires. When receiving the response to the bandwidth request, the MS 400 recognizes an allocation of a bandwidth by the BS. Therefore, when the first timer has expired without an allocation of the bandwidth, the MS 400 determines that the first reason, or the second reason, has caused the failure in transmitting the first sub-band preparation indicator.

The second scheme detects that the failure in transmitting the first sub-band preparation indicator has been caused by the third reason.

According to the second scheme, when a bandwidth has been successfully allocated, the MS 400 transmits the first sub-band preparation indicator to the BS 410 by using the allocated bandwidth (in step 407). At this time, simultaneously while transmitting the first sub-band preparation indicator (in step 407), the MS 400 starts a second timer waiting for a bandwidth allocation message or reception message that is a response to the first sub-band preparation indicator. The MS 400 moniters the response message before the second timer expires, that is, before a preset waiting time interval expires. When receiving the response message to the first sub-band preparation indicator, the MS 400 recognizes an approval of the data transmission using the first sub-band. Therefore, when the second timer has expired without reception of the response message to the first sub-band preparation indicator, the MS 400 determines and detects the failure in transmitting the first sub-band preparation indicator.

Meanwhile, when the MS 400 detects the failure in transmitting the first sub-band preparation indicator (in step 409), the MS 400 transmits a failure indicator (first sub-band failure indicator), which indicates that the trial for data transmission/reception using the first sub-band has resulted in a failure, to the BS 410 through the primary band 412 (in step 411). Upon receiving the first sub-band failure indicator from the MS 400, the BS 410 transmits information (second sub-band information) on the second sub-band different from the first sub-band to the MS 400 by using the primary band 412 (in step 413).

By using the second sub-band information acquired in step 413, the MS 400 acquires synchronization for the second sub-band 416 and performs ranging with the BS 410 (in step 415).

Figure 5:
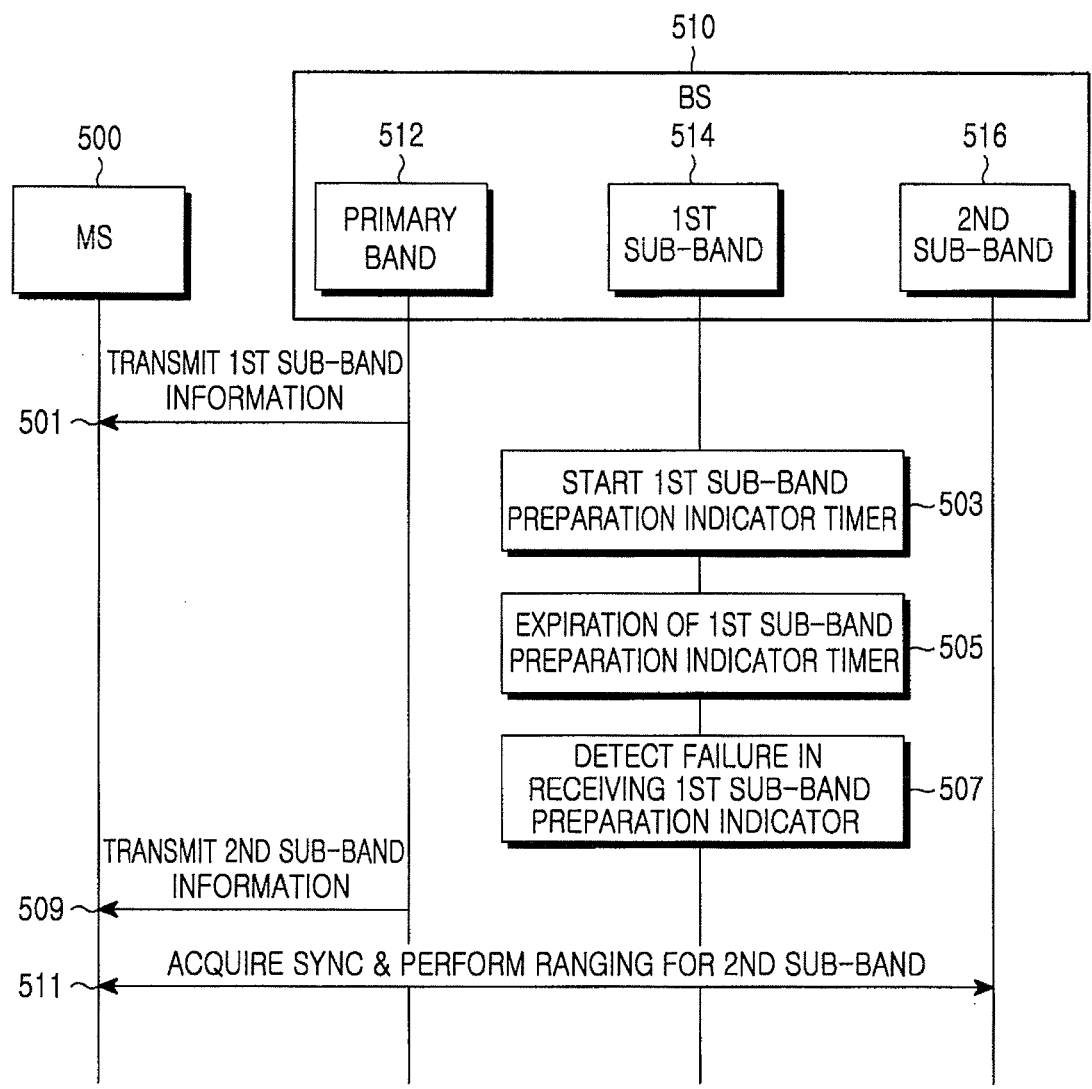
FIG. 5 illustrates a process in an overlay communication system according to an embodiment of the present invention.

FIG. 5 illustrates a process in an overlay communication system according to an embodiment of the present invention. That is, FIG. 5 shows a process of transmitting/receiving a second sub-band preparation indicator in order to use a second sub-band when transmission/reception of the first sub-band preparation indicator by the BS has failed.

The overlay communication system includes an MS 500 and a BS 510, and the BS 510 operates three frequency bands, which include a primary band 512, a first sub-band 514, and a second sub-band 516. Further, the present embodiment discusses, for example, a case in which the BS 510 fails in receiving the first sub-band preparation indicator.

Referring to FIG. 5, the BS 510 transmits first sub-band information through the primary band 512 to the MS 500 (in step 501). Then, the BS 510 starts a timer waiting for the first sub-band preparation indicator from the MS 500 (in step 503). Although the timer is started to detect reception of the first sub-band indicator in the present embodiment, it is possible to use the timer in order to detect reception of any information indicating preparation for data transmission/reception through the first sub-band. The timer value is determined in consideration of sufficient time for reception of the first sub-band preparation indicator from the MS 500 by the BS 510. That is, the timer value is required to be determined in consideration of a time interval from provision of the first sub-band information by the BS 510 to reception of the first sub-band preparation indicator transmitted from the MS 500 by the BS 510. The BS 510 fails in receiving the first sub-band preparation indicator from the MS 500 and the timer expires (in step 505).

Then, the BS 510 detects the failure in receiving the first sub-band preparation indicator (in step 507). After detecting the failure in receiving the first sub-band preparation indicator, the BS 510 transmits second sub-band information different from the first sub-band 514 to the MS 500 through the primary band (in step 509). By using the second sub-band information acquired in step 509, the MS 500 acquires synchronization for the second sub-band 516 and performs ranging with the BS 510 (in step 511).

Hereinafter, schemes for transmitting/receiving data between an MS and a BS through all sub-bands operated by the BS will be described with reference to FIGS. 6 through 9.

Figure 6:
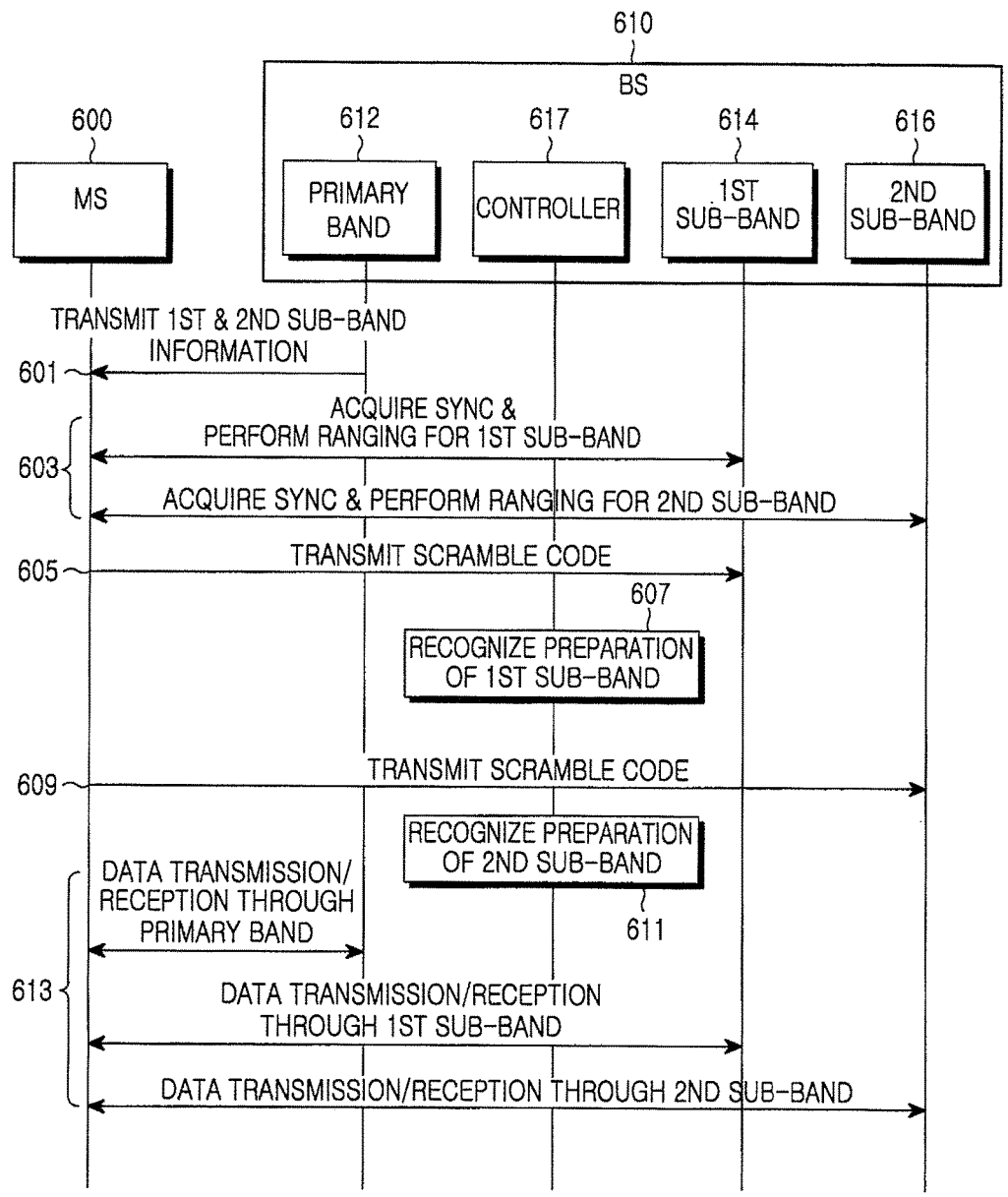
FIG. 6 illustrates a process for data transmission/reception between an MS and a BS in an overlay communication system according to an embodiment of the present invention.

FIG. 6 illustrates a process for data transmission/reception between an MS and a BS in an overlay communication system according to an embodiment of the present invention. More particularly, FIG. 6 shows a process of transmitting/receiving a sub-band preparation indication, which indicates that the MS and the BS have been prepared for data transmission/reception by using sub-bands, through the sub-bands before the data transmission/reception between the MS and the BS.

As a presumption before describing FIG. 6, the overlay communication system includes an MS 600 and a BS 610. The BS 610 operates in three frequency bands, which include a primary band 612, a first sub-band 614, and a second sub-band 616.

Referring to FIG. 6, the BS 610 transmits first sub-band information and second sub-band information to the MS 600 through the primary band 612 (in step 601). By using the first sub-band information and the second sub-band information acquired in step 601, the MS 600 acquires synchronization for the corresponding sub-bands, and performs ranging for the first sub-band and the second sub-band (in step 603).

Through the first sub-band 614, the MS 600 transmits a scramble code, indicating that it has prepared for data transmission/reception through the corresponding sub-band 614, to the BS 610 (in step 605). The scramble code refers to a scrambled code in which an identifier of the MS 600 is scrambled. The scrambled code may be a result obtained by scrambling the identifier of the MS with a scrambling code or a scrambling code masked by the identifier of the MS. Upon receiving the scramble code, the BS 610 recognizes, through a controller 617 within the BS 610, that the MS 600 has been prepared for data transmission/reception through the first sub-band 614 (in step 607).

Further, the MS 600 transmits a scramble code to the BS 610 through the second sub-band 616 (in step 609). Upon receiving the scramble code, the BS 610 recognizes through the controller 617 that the MS 600 has been prepared for data transmission/reception through the second sub-band 616 (in step 611).

The MS 600, which has transmitted the scramble codes indicating that the MS 600 has been prepared for data transmission/reception through the corresponding sub-bands 614 and 616, performs data transmission/reception to the BS 610 through the primary band 612, the first sub-band 614, and the second sub-band 616 (in step 613).

Figure 7:
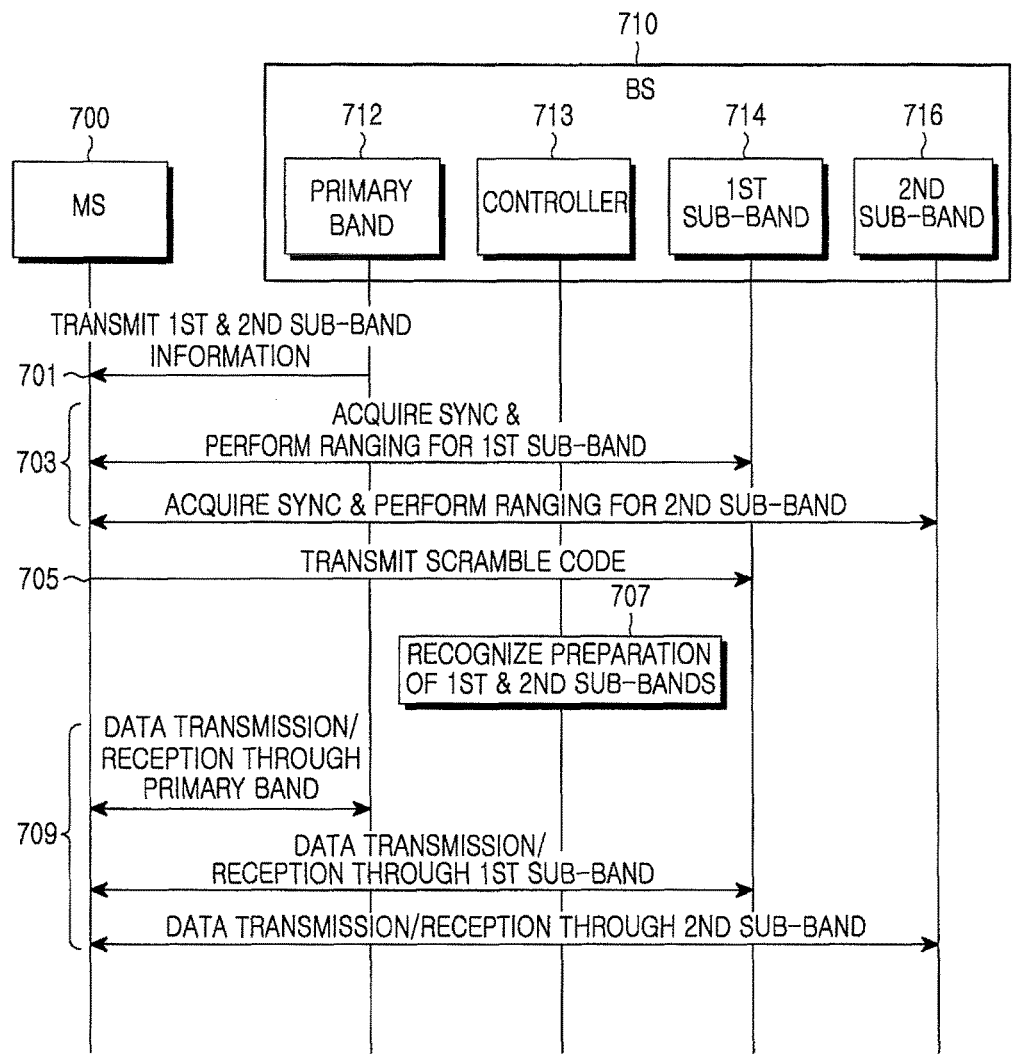
FIG. 7 illustrates a process for data transmission/reception between an MS and a BS in an overlay communication system according to an embodiment of the present invention.

FIG. 7 illustrates a process for data transmission/reception between an MS and a BS in an overlay communication system according to an embodiment of the present invention. More particularly, FIG. 7 shows a process of transmitting/receiving a sub-band preparation indication, which indicates that the MS and the BS have been prepared for data transmission/reception through multiple sub-bands, through a particular sub-band before the data transmission/reception between the MS and the BS.

The overlay communication system includes an MS 700 and a BS 710. The BS 710 operates three frequency bands that include a primary band 712, a first sub-band 714, and a second sub-band 716.

Referring to FIG. 7, the BS 710 transmits first sub-band information and second sub-band information to the MS 700 through the primary band 712 (in step 701). By using the first sub-band information and the second sub-band information acquired in step 701, the MS 700 acquires synchronization for the corresponding sub-bands, and performs ranging for the first sub-band and the second sub-band (in step 703).

Through the first sub-band 714, the MS 700 transmits a scramble code, indicating that it has prepared for data transmission/reception through the sub-bands 714 and 716, to the BS 710 (in step 705). Although the present embodiment discusses an example in which the scramble code is transmitted through the first sub-band 714, the scramble code can be transmitted through any sub-band from among the sub-bands operated by the BS 710. Upon receiving the scramble code, the BS 710 recognizes, through a controller 713 within the BS 710, that the MS 700 has been prepared for data transmission/reception through the first sub-band 714 and the second sub-band 716 (in step 707).

The MS 700, which has transmitted the scramble code indicating that the MS 700 has been prepared for data transmission/reception through the corresponding sub-bands 714 and 716, performs data transmission/reception to the BS 710 through the primary band 712, the first sub-band 714, and the second sub-band 716 (in step 709).

Figure 8:
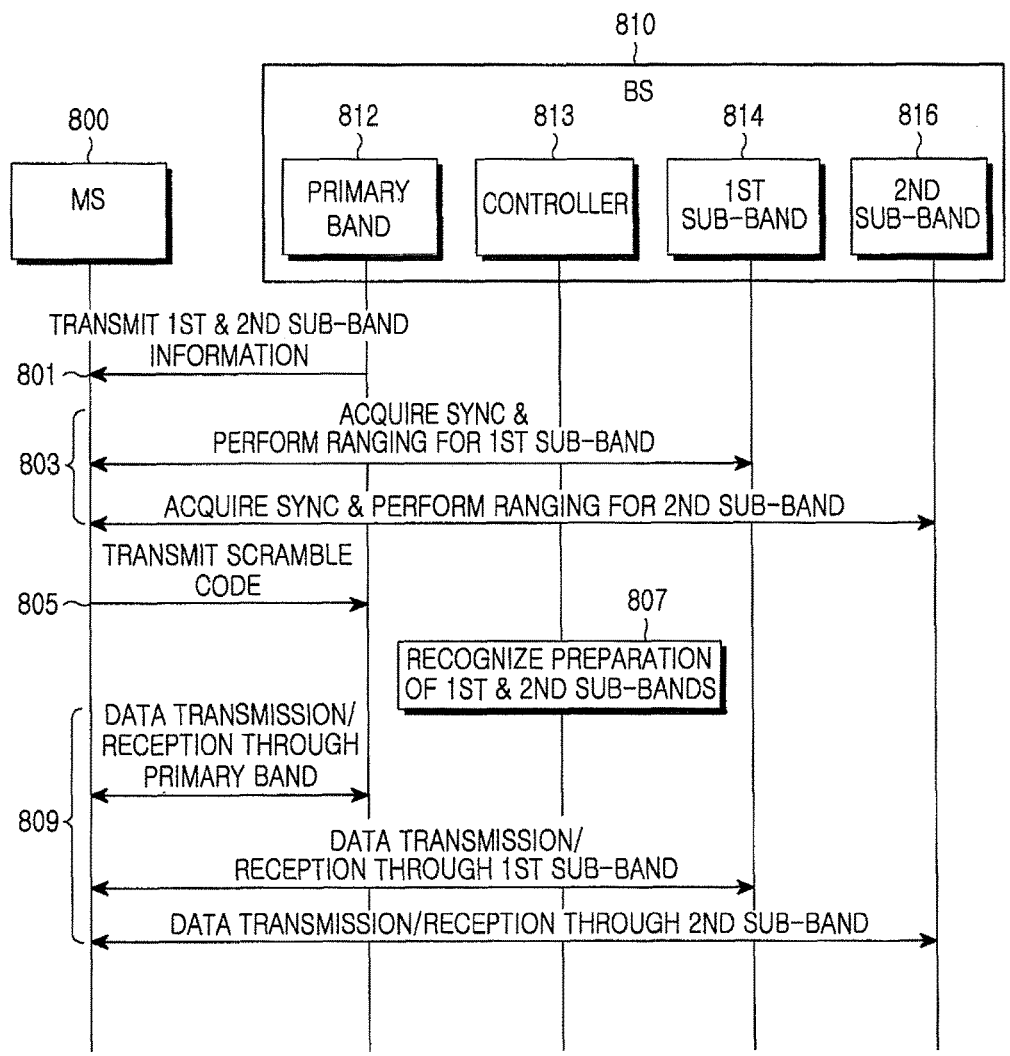
FIG. 8 illustrates a process for data transmission/reception between an MS and a BS in an overlay communication system according to an embodiment of the present invention.

FIG. 8 illustrates a process for data transmission/reception between an MS and a BS in an overlay communication system according to another embodiment of the present invention. More particularly, FIG. 8 shows a process of transmitting/receiving a sub-band preparation indication, which indicates that the MS and the BS have been prepared for data transmission/reception through multiple sub-bands, through a primary band before the data transmission/reception between the MS and the BS.

The overlay communication system includes an MS 800 and a BS 810. The BS 810 operates three frequency bands that include a primary band 812, a first sub-band 814, and a second sub-band 816.

Referring to FIG. 8, the BS 810 transmits first sub-band information and second sub-band information to the MS 800 through the primary band 812 (in step 801). By using the first sub-band information and the second sub-band information acquired in step 801, the MS 800 acquires synchronization for the corresponding sub-bands, and performs ranging for the first sub-band and the second sub-band (in step 803).

Through the primary band 812, the MS 800 transmits a scramble code, indicating that it has prepared for data transmission/reception through the sub-bands 814 and 816, to the BS 810 (in step 805). Upon receiving the scramble code, the BS 810 recognizes, through a controller 813 within the BS 810, that the MS 800 has been prepared for data transmission/reception through the first sub-band 814 and the second sub-band 816 (in step 807).

The MS 800, which has transmitted the scramble code indicating that the MS 800 has been prepared for data transmission/reception through the corresponding sub-bands 814 and 816, performs data transmission/reception to the BS 810 through the primary band 812, the first sub-band 814, and the second sub-band 816 (in step 809).

Figure 9:
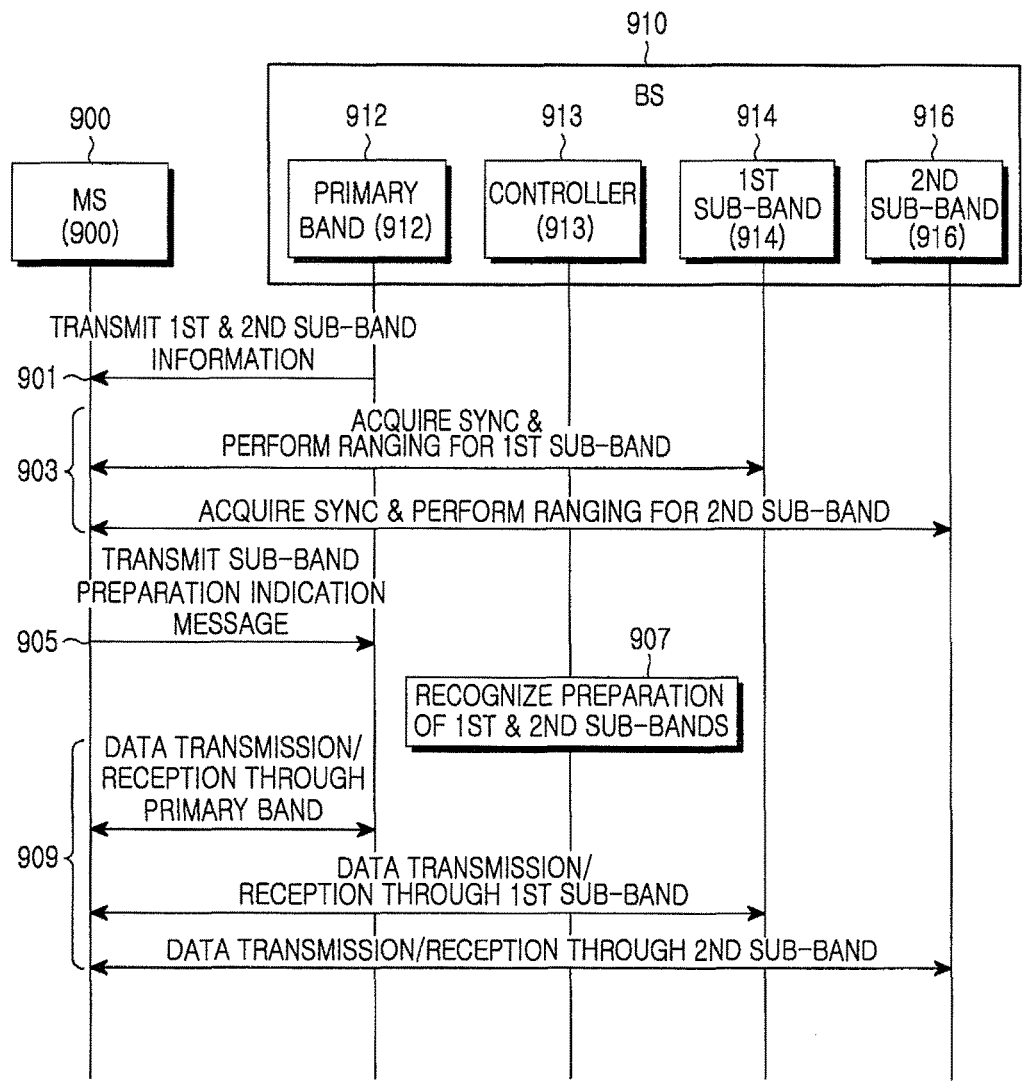
FIG. 9 illustrates a process for data transmission/reception between an MS and a BS in an overlay communication system according to an embodiment of the present invention.

FIG. 9 illustrates a process for data transmission/reception between an MS and a BS in an overlay communication system according to another embodiment of the present invention. More particularly, FIG. 9 shows a process of transmitting/receiving a sub-band preparation indication in the form of a message, which indicates that the MS and the BS have been prepared for data transmission/reception through multiple sub-bands, through a primary band before the data transmission/reception between the MS and the BS.

The overlay communication system includes an MS 900 and a BS 910. The BS 910 operates three frequency bands that include a primary band 912, a first sub-band 914, and a second sub-band 916.

Referring to FIG. 9, the BS 910 transmits first sub-band information and second sub-band information to the MS 900 through the primary band 912 (in step 901). By using the first sub-band information and the second sub-band information acquired in step 901, the MS 900 acquires synchronization for the corresponding sub-bands, and performs ranging for the first sub-band 914 and the second sub-band 916 (in step 903).

Through the primary band 912, the MS 900 transmits a sub-band preparation indication message, indicating that it has prepared for data transmission/reception through all the sub-bands 914 and 916, to the BS 910 (in step 905). Upon receiving the sub-band preparation indication message, the BS 910 recognizes, through a controller 913 within the BS 910, that the MS 900 has been prepared for data transmission/reception through the first sub-band 914 and the second sub-band 916 (in step 907).

The MS 900, which has transmitted the sub-band preparation indication message indicating that the MS 900 has been prepared for data transmission/reception through the corresponding sub-bands 914 and 916, performs data transmission/reception to the BS 910 through the primary band 912, the first sub-band 914, and the second sub-band 916 (in step 909).

Meanwhile, the sub-band preparation indication message may indicate if data transmission/reception through each sub-band is possible or not, as well as indicating the preparation for data transmission/reception through all the sub-bands 914 and 916 described above. For example, if the MS 900 has been prepared for data transmission/reception through the first sub-band 914 but is not prepared for data transmission/reception through the second sub-band 916, the MS 900 transmits a sub-band preparation indication message, which indicates that data transmission/reception through the first sub-band 914 is possible but data transmission/reception through the second sub-band 916 is impossible, to the BS 910 in step 905. At this time, the information if data transmission/reception through each sub-band is possible can be expressed by bitmap information, identifier information of the sub-band through data transmission/reception is possible, and identifier information of the sub-band through data transmission/reception is impossible.

Upon receiving the sub-band preparation indication message, which indicates that data transmission/reception through the second sub-band 916 is impossible, the BS 910 can provide information on the second sub-band and the third sub-band to the MS 900 in a way similar to that in step 413 of FIG. 4 or step 509 of FIG. 5.

Figure 10:
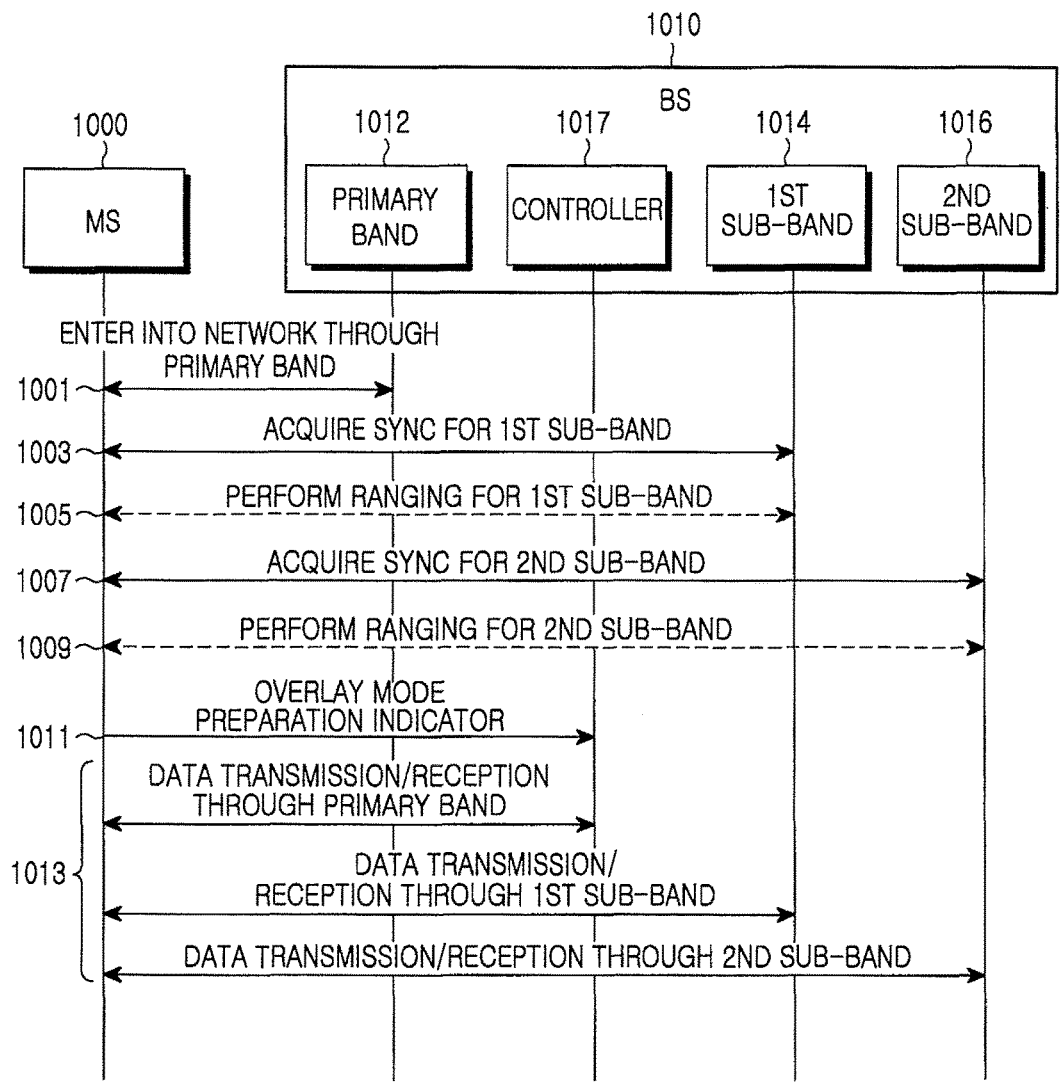
FIG. 10 illustrates a process for data transmission/reception between an MS and a BS in an overlay communication system according to an embodiment of the present invention.

FIG. 10 illustrates a process for data transmission/reception between an MS and a BS in an overlay communication system according to another embodiment of the present invention.

The overlay communication system includes an MS 1000 and a BS 1010 The BS 1010 operates three frequency bands that include a primary band 1012, a first sub-band 1014, and a second sub-band 1016.

Referring to FIG. 10, the MS 1000 performs a network entry process with the BS 1010 through the primary band 1012 (in step 1001). The network entry process includes an initial network entry process, a handover process, and an idle mode network reentry process. The MS 1000 acquires synchronization for the first sub-band 1014 and the second sub-band 1016 by using information of the sub-bands to be used in an overlay mode operation thereof (in step 1003 and in step 1007). It is assumed that the information of the sub-bands to be used in an overlay mode operation have been acquired in or before step 1001. Further, the process of acquiring synchronization for the first sub-band 1014 and the second sub-band 1016 by the MS 1000 includes a step of receiving a system information channel including system information and synchronization channels transmitted through the first sub-band 1014 and the second sub-band 1016.

Thereafter, the MS 1000 performs ranging for the first sub-band 1014 and the second sub-band 1016 (in step 1005 and in step 1009). Here, the ranging corresponds to, for example, a periodic ranging. The ranging process (in step 1005 and in step 1009) includes a step of making a ranging request to the BS 1010 by the MS 1000 by transmitting a periodic ranging code to the BS 1010 through the first sub-band 1014 and the second sub-band 1016 and a step of receiving a ranging response message, which is a response to the ranging request, from the BS 1010.

Then, the MS 1000 transmits an overlay mode preparation indicator to a controller 1017 of the BS 1010 (in step 1011). That is, the MS 1000 transmits the overlay mode preparation indicator to the controller 1017 of the BS 1010, thereby notifying that it has prepared for data transmission/reception through the first sub-band 1014 and the second sub-band 1016. Thereafter, the MS 1000 performs data transmission/reception with the BS 1010 through the primary band 1012, the first sub-band 1014, and the second sub-band 1016 (in step 1013).

In the embodiment shown in FIG. 10, after the synchronization for each sub-band is acquired (in steps 1003 or 1007), a ranging process for the corresponding sub-band is performed (in steps 1005 or 1009). However, it is of course possible to omit the ranging process according to the system situation. When the ranging process (in steps 1005 or 1009) is omitted, the MS 1000 can transmit the overlay mode preparation indicator (in step 1011) without performing the ranging process (in steps 1005 or 1009) after acquiring the synchronization for each sub-band (in steps 1003 or 1007).

Meanwhile, the overlay mode preparation indicator in step 1011 can be transmitted through one of the primary band 1012, the first sub-band 1014, and the second sub-band 1016, and the overlay mode preparation indicator can be transmitted in the form of a control message (MAC control message) of a Media Access Control (MAC) layer, a Channel Quality Indication (CQI) code, a pre-allocated code, etc.

(1) MAC Control Message

The overlay mode preparation indicator can be transmitted in the form of a MAC control message that can be expressed as shown in Table 2 below. The MAC control message corresponds to at least one of a typical MAC control message, a header, a sub-header, and an extended sub-header.

TABLE 2

| | |
|---|---|
| message type field | which indicates the type of MAC control message e.g.) FO readiness indicator |
| sub-band bitmap field | that indicates if sub-bands are prepared to be used for data transmission/reception when sub-bands are prepared to be used for data transmission/reception, the bit value is set to "1" when sub-bands are not prepared to be used for data transmission/reception, the bit value is set to "0" |

The overlay mode preparation indicator transmitted in the form of a MAC control message shown in Table 2 includes a message type field and a sub-band bitmap field. The message type field indicates the type of the MAC control message. When the message type field is set as, for example, a Frequency Overlay (FO) readiness indicator, it is noted that MAC control message is an overlay mode preparation indicator message.

The sub-band bitmap field indicates if the sub-bands to be used for data transmission/reception by the MS are prepared to be used or not. The order of bits of the bitmap recorded in the sub-band bitmap field corresponds to the sequence of the sub-bands allocated to the MS by the BS. For example, the BS 1010 can allocate sub-bands to the MS 1000 in the order of the second sub-band 1016 and then the first sub-band 1014, and the sub-band bitmap field can include eight (8) bits. At this time, in order for the MS 1000 to notify the BS 1010 that the second sub-band 1016 and the first sub-band 1014 are prepared for data transmission/reception, the MS 1000 transmits a MAC control message having a sub-band bitmap field set to "11000000" to the BS 1010. Upon receiving the MAC control message having a sub-band bitmap field set to "11000000," the BS 1010 recognizes that the MS 1000 has been prepared for data transmission/reception through the second sub-band 1016 and the first sub-band 1014.

The MAC control message may include a transaction identifier field. The transaction identifier is used when a response signal to the overlay mode preparation indicator is separately defined. The response signal to the overlay mode preparation indicator will be described later in detail with reference to FIG. 11.

(2) CQI Code

The overlay mode preparation indicator may be transmitted in the form of a CQI code. Specifically, the overlay mode preparation indicator for each of all the sub-bands usable in the BS may be transmitted in the form of a CQI code. That is, for each of all the sub-bands usable in the BS, a CQI code to be used for an overlay mode preparation indicator is defined. In order to notify the sub-bands to be prepared for data transmission/reception from among the sub-bands allocated by the BS, the MS transmits the defined CQI code through a CQI channel. The CQI channel is allocated to a primary band of the MS, and the order of the CQI codes corresponds to the order of the sub-bands allocated to the MS. For example, let us assume that the BS 1010 allocates the sub-bands to the MS 1000 in the order of the second sub-band 1016 and the first sub-band 1014. Then, in order for the MS 1000 to notify the BS 1010 that the second sub-band 1016 and the first sub-band 1014 are prepared for data transmission/reception, the MS 1000 transmits, through a CQI channel, the first CQI code and the second CQI code from among the CQI codes defined for the overlay mode preparation indicators. Upon receiving the first CQI code and the second CQI code, the BS 1010 recognizes that the MS 1000 has been prepared for data transmission/reception through the second sub-band 1016 and the first sub-band 1014.

(3) Pre-Allocated Code

The overlay mode preparation indicator may be transmitted in the form of a pre-allocated code.

The BS 1010 pre-allocates a code (e.g., a ranging code) to the MS 1000 in a network entry/reentry registration process or an overlay mode negotiation process between the BS 1010 and the MS 1000. The MS 1000 can transmit the pre-allocated ranging code through the primary band 1012 or each sub-band 1014 or 1016. For example, the pre-allocated ranging code is transmitted using at least one sub-band when the ranging for at least one sub-band is completed, while it is transmitted using the primary band when the ranging for said at least one sub-band is not completed.

By transmitting the pre-allocated ranging code through each of the sub-bands 1014 and 1016, the MS 1000 can notify the BS 1010 that it has been prepared for data transmission and reception through each of the sub-bands 1014 and 1016 simultaneously while performing ranging for each of the sub-bands 1014 and 1016 by using the pre-allocated ranging codes.

That is, in steps 1005 and 1009 of FIG. 10, the MS 1000 can transmit a pre-allocated ranging code through the first sub-band 1014 and the second sub-band 1016 instead of transmitting a periodic ranging code through the first sub-band 1014 and the second sub-band 1016, so as to perform the ranging for the first sub-band 1014 and the second sub-band 1016 and notify the BS 1010 that it has been prepared for data transmission and reception through each of the sub-bands 1014 and 1016. Further, even when the ranging process (in steps 1005 and 1009) is omitted, the MS 1000 can transmit a pre-allocated ranging code through the first sub-band 1014 and the second sub-band 1016, so as to notify the BS 1010 that it has been prepared for data transmission and reception through each of the sub-bands 1014 and 1016.

Meanwhile, by transmitting the pre-allocated ranging code through the primary band 1012, the MS 1000 can notify the BS 1010 that it has been prepared for data transmission and reception through the primary band 1012.

That is, after steps 1005 and 1009 of FIG. 10, the MS 1000 can transmit the pre-allocated ranging code through the primary band 1012, so as to notify the BS 1010 that it has been prepared for data transmission and reception through the primary band 1012. Further, even when the ranging process (in steps 1005 and 1009) is omitted, the MS 1000 can transmit a pre-allocated ranging code through the primary band 1012, so as to notify the BS 1010 that it has been prepared for data transmission and reception through the primary band 1012.

Meanwhile, when an MS operating in the overlay mode performs a handover, the overlay mode preparation indicator can be transmitted in the form of a pre-allocated ranging code.

In the process of handover negotiation between a serving BS and the MS, the MS is pre-allocated a ranging code through a handover control message received from the serving BS. The pre-allocated ranging code is transmitted through one of a primary band and at least one sub-band of a target BS. The pre-allocated ranging code functions as the overlay mode preparation indicator as well as being is used for ranging for the primary band and each sub-band.

Figure 11:
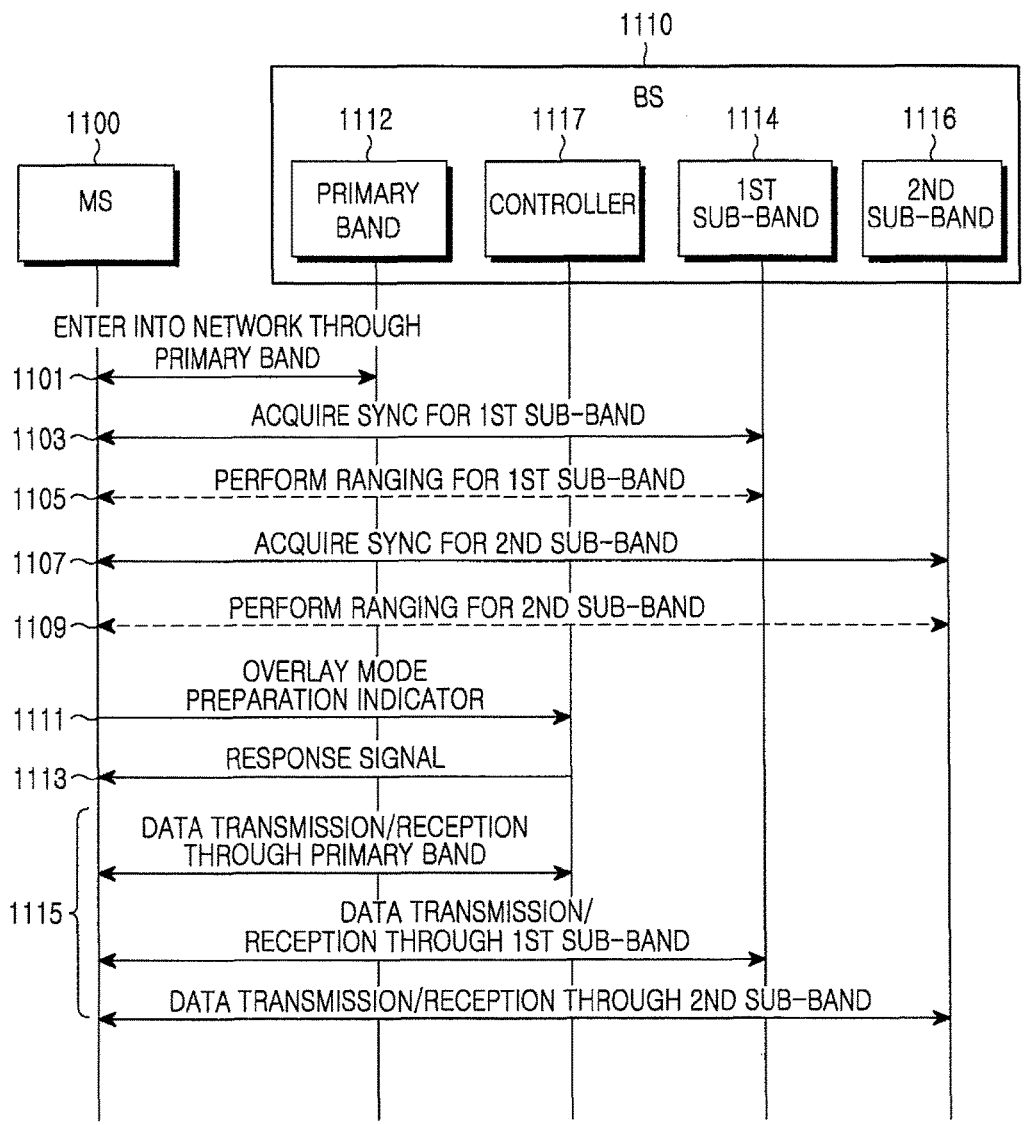
FIG. 11 illustrates a process for data transmission/reception between an MS and a BS in an overlay communication system according to an embodiment of the present invention.

FIG. 11 illustrates a process for data transmission/reception between an MS and a BS in an overlay communication system according to another embodiment of the present invention.

As a presumption before describing FIG. 11, the overlay communication system includes an MS 1100 and a BS 1110. The BS 1110 operates three frequency bands that include a primary band 1112, a first sub-band 1114, and a second sub-band 1116.

Referring to FIG. 11, the MS 1100 performs a network entry process with the BS 1110 through the primary band 1112 (in step 1101). The MS 1100 acquires synchronization for the first sub-band 1114 and the second sub-band 1116 by using information of the sub-bands to be used in an overlay mode operation thereof (in step 1103 and in step 1107). It is assumed that the information of the sub-bands to be used in an overlay mode operation has been acquired in or before step 1101. Further, the process of acquiring synchronization for the first sub-band 1114 and the second sub-band 1116 by the MS 1100 includes a step of receiving a system information channel including system information and synchronization channels transmitted through the first sub-band 1114 and the second sub-band 1116.

Thereafter, the MS 1100 performs ranging for the first sub-band 1114 and the second sub-band 1116 (in step 1105 and in step 1109). Here, the ranging corresponds to, for example, a periodic ranging. The ranging process (in step 1105 and in step 1109) includes a step of making a ranging request to the BS 1110 by the MS 1100 by transmitting a periodic ranging code to the BS 1110 through the first sub-band 1114 and the second sub-band 1116 and a step of receiving a ranging response message, which is a response to the ranging request, from the BS 1110.

Then, the MS 1100 transmits an overlay mode preparation indicator to a controller 1117 of the BS 1110 (in step 1111). That is, the MS 1100 transmits the overlay mode preparation indicator to the controller 1117 of the BS 1110, thereby notifying that it has prepared for data transmission/reception through the first sub-band 1114 and the second sub-band 1116. As used herein, the overlay mode preparation indicator can be transmitted in the form of a MAC control message, a CQI code, and a pre-allocated dedicated code, etc. Upon receiving the overlay mode preparation indicator, the BS 1110 transmits a response signal to the overlay mode preparation indicator to the MS 1100 (in step 1113). Thereafter, the MS 1100 performs data transmission/reception with the BS 1110 through the primary band 1112, the first sub-band 1114, and the second sub-band 1116 (in step 1115).

In the embodiment shown in FIG. 11, after the synchronization for each sub-band is acquired (in step 1103 or 1107), a ranging process for the corresponding sub-band is performed (in step 1105 or 1109). However, it is of course possible to omit the ranging process according to the system situation. When the ranging process (in step 1105 or 1109) is omitted, the MS 1100 can transmit the overlay mode preparation indicator (in step 1111) without performing the ranging process (in steps 1105 or 1109) after acquiring the synchronization for each sub-band (in steps 1103 or 1107).

Meanwhile, the response signal in step 1113 may be transmitted in the form of a MAC control message, downlink data, and a ranging response message.

(1) MAC Control Message

The response message to the overlay mode preparation indicator can be transmitted in the form of a MAC control message that can be expressed as shown in Table 3 below. The MAC control message corresponds to at least one of a typical MAC control message, a header, a sub-header, and an extended sub-header.

TABLE 3

| | |
|---|---|
| Message type field | which indicates the type of the MAC control message e.g.) FO readiness indicator |
| Transaction identifier field | that indicates a transaction identifier corresponding to the overlay mode preparation indicator |
| Overlay mode indicator field | that indicates that it is a response to the overlay mode preparation indicator |

The response message transmitted in the form of a MAC control message shown in Table 3 includes a message type field, a transaction identifier field, and an overlay mode indicator field. The message type field indicates the type of the MAC control message. When the message type field is set as, for example, an FO readiness indicator acknowledgement (ACK), it is noted that the MAC control message is a response message with respect to an overlay mode preparation indicator.

Only when the overlay mode preparation indicator according to Table 3 includes a transaction identifier field, the response signal also can include a transaction identifier field. The transaction identifier field is set to have the same value as the transaction identifier included in the overlay mode preparation indicator.

The overlay mode indicator field indicates that the response signal is a response to the overlay mode preparation indicator only when the overlay mode preparation indicator does not include the transaction identifier field. For example, when the overlay mode preparation indicator is transmitted in the form of a CQI code, the ES having received the CQI code can transmit a response signal including the overlay mode indicator field to the MS in order to notify that the response signal is a response to the overlay mode preparation indicator. (2) Downlink data When downlink data exists, the response signal to the overlay mode preparation indicator can be transmitted in the form of the downlink data to the MS through one of sub-bands. Upon receiving the downlink data through one of the sub-bands, the MS recognizes that the downlink data is a response signal with respect to the overlay mode preparation indicator.

(3) Ranging Response Message

When the overlay mode preparation indicator is transmitted in the form of a pre-allocated ranging code, the response signal to the overlay mode preparation indicator can be transmitted in the form of a ranging message. The ranging response message includes a pre-allocated ranging code. For example, upon receiving the overlay mode preparation indicator transmitted in the form of a pre-allocated ranging code through the primary band 1112, the BS 1110 transmits the ranging response message through the primary band 1112. Upon receiving the overlay mode preparation indicator transmitted in the form of a pre-allocated ranging code through the sub-bands 1114 and 1116, the BS 1110 transmits the ranging response message through the sub-bands 1114 and 1116.

Meanwhile, in order to perform data transmission/reception with the BS through bands (e.g., sub-bands) other than the primary band, it is inevitable for the MS to perform the ranging process for each of the sub-bands. A ranging process in an overlay communication system according to an embodiment of the present invention will be described in detail with reference to FIGS. 12 and 13. The overlay communication system includes an MS and a BS, and the BS operates two frequency bands, which include a primary band and a sub-band.

Figure 12:
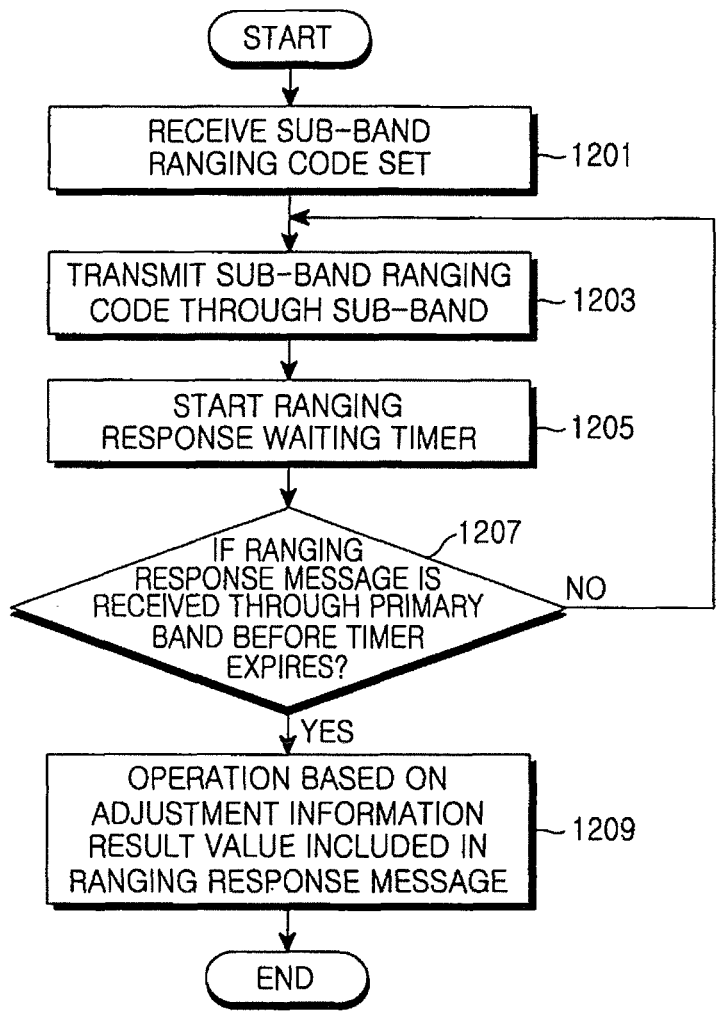
FIG. 12 illustrates a ranging process for a sub-band by an MS in an overlay communication system according to an embodiment of the present invention.

FIG. 12 illustrates a ranging process for a sub-band by an MS in an overlay communication system according to an embodiment of the present invention.

Referring to FIG. 12, the MS receives a sub-band ranging code set from the BS in step 1201, and then proceeds to step 1203. The sub-band ranging code set corresponds to another ranging code set other than the initial ranging code set, the periodic ranging code set, the handover ranging code set, the bandwidth request ranging code set from among the ranging code sets. Especially, the sub-band ranging code set refers to a ranging code set separately managed in order to enable the MS to transmit a ranging message through the sub-bands when the MS performs a ranging process for the sub-bands in an overlay communication system. The sub-band ranging code set can be acquired from either the system information transmitted through the primary band or the system information transmitted through a sub-band when the system information is separately broadcast through the sub-band.

In step 1203, the MS transmits a sub-band ranging code through the sub-band to the BS, and then proceeds to step 1205. At this time, the sub-band ranging code is selected from ranging codes included in the sub-band ranging code set. In step 1205, the MS starts a waiting timer waiting for a ranging response with respect to the sub-band ranging code.

Then, in step 1207, the MS determines if a ranging response message is received from the BS before the ranging response waiting timer started in step 1205 expires. As a result of the determination, when a ranging response message is received before the ranging response waiting timer expires, the MS proceeds to step 1209. The ranging response message is transmitted through a broadcast channel and includes the sub-band ranging code, information on the symbol area/sub-channel area/frame number in which the sub-band ranging code is transmitted, information on the band through which the sub-band ranging code is received, and an adjustment information result value for the sub-band ranging code. The adjustment information result value includes a success code notifying a success in receiving the sub-band ranging code by the BS, an abort code notifying a failure in receiving the sub-band ranging code, and a continue code requiring readjustment and retransmission of a transmission parameter of the sub-band ranging code. Further, the transmission parameter includes a power offset, a time synchronization offset, and a frequency synchronization offset.

In step 1209, the MS performs an operation according to the adjustment information result value included in the ranging response message. When the adjustment information result value includes the success code, the MS performs a next operation for use of the sub-band. When the adjustment information result value includes the abort code, the MS retransmits the sub-band ranging code transmitted in step 1203. When the adjustment information result value includes the continue code, the MS readjusts and retransmits the transmission parameter of the sub-band ranging code. Further, through the other information except for the adjustment information result value from among the information included in the ranging response message, it is possible to determine if the ranging response message is a response message with respect to the sub-band ranging code transmitted in step 1203.

Meanwhile, as a result of the determination in step 1207, when a ranging response message is not received before the ranging response waiting timer expires, the MS proceeds to step 1203. In step 1203, the MS retransmits the sub-band ranging code through the sub-band.

Figure 13:
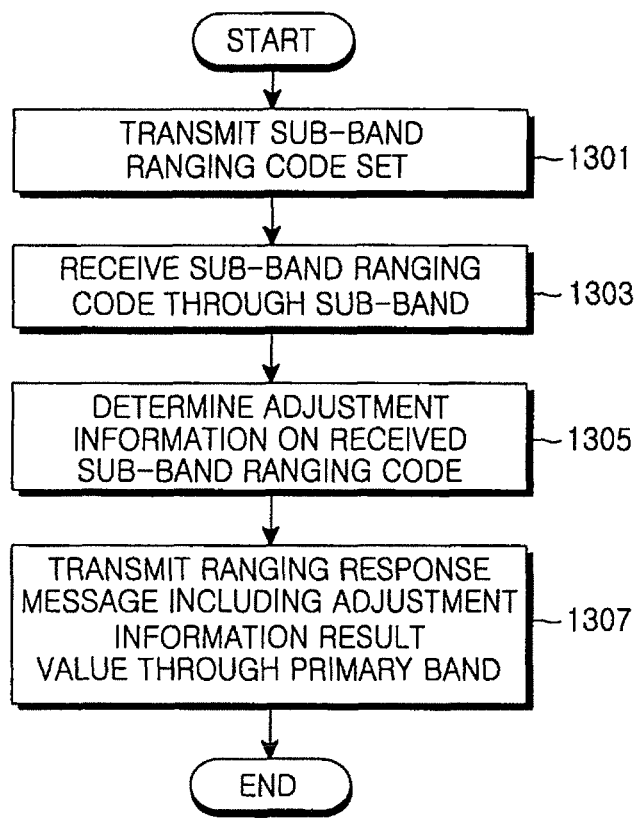
FIG. 13 illustrates a ranging process for a sub-band by a BS in an overlay communication system according to an embodiment of the present invention.

FIG. 13 illustrates a ranging process for a sub-band by a BS in an overlay communication system according to an embodiment of the present invention.

Referring to FIG. 13, the BS transmits a sub-band ranging code set from the MS in step 1301, and then proceeds to step 1303. The sub-band ranging code set can be transmitted through all bands controlled by the BS. However, the present embodiment is based on an assumption that the sub-band ranging code set is transmitted through the primary band of the MS. In step 1303, the BS receives the sub-band ranging code set from the MS through the sub-band.

Then, in step 1305, the BS detects an adjustment information result value by determining adjustment information on the received sub-band ranging code, and then proceeds to step 1307. The adjustment information includes information indicating whether or not the BS has received the sub-band ranging code, and information indicating whether or not the ES must transmit a parameter adjustment indication to the MS having transmitted the sub-band ranging code.

In step 1307, the BS transmits a ranging response message including the detected adjustment information result value to the MS through the primary band. At this time, if the BS cannot identify the primary band of the MS, the BS can transmit the ranging response message through all the primary bands controlled by the BS. The BS may fail to identify the primary band of the MS, for example, when the BS operates at least three primary bands and cannot identify which band is the primary band of the MS having transmitted the sub-band ranging code received by the BS itself.

When the BS cannot identify the primary band of the MS as described above, it is possible to employ the following scheme in order to enable the BS to identify the primary band of the MS.

The MS selects the sub-band ranging code from the sub-band ranging code set received through the primary band of the MS, and transmits the selected sub-band ranging code to the BS through the sub-band of the MS. Upon receiving the sub-band ranging code through the sub-band, the BS can identify the primary band of the MS, and can transmit a response to the sub-band ranging code to the MS through the primary band. At this time, the sub-band ranging code sets transmitted through the bands are required to be exclusive to each other so as to prevent the sub-band ranging code sets transmitted through the primary bands from overlapping or interfering with each other.

As described above, the present invention supports use of multiple frequency bands by a mobile station in a wireless communication system, thereby enabling transmission and reception of large-capacity data. Further, according to the present invention, when a mobile station and a base station fail in transmitting/receiving a first sub-band preparation indicator, they can transmit/receive data through a second sub-band. Therefore, the present invention can achieve a more stable transmission and reception of large-capacity data.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of managing frequency bands by a base station in a wireless communication system, the method comprising:
   transmitting, to a mobile station through a primary frequency band, control information on one or more secondary frequency bands different from the primary frequency band;
   communicating with the mobile station through the primary frequency band;
   performing a synchronization procedure with the mobile station through a first secondary frequency band from among the one or more secondary frequency bands;
   in response to the mobile station acquiring synchronization with the first secondary frequency band, receiving, from the mobile station through the first secondary frequency band, a readiness indication message indicating that the first secondary frequency band is prepared for a data transmission on the first secondary frequency band based on the control information; and
   transmitting, to the mobile station, a first data signal through the primary frequency band concurrently with a second data signal through the first secondary frequency band in response to receiving the readiness indication message, the first and second data signals comprising data transmissions for the mobile station.

2. A method of managing at least one frequency by a mobile station in a wireless communication system, the method comprising:
   receiving, from a base station through a primary frequency band, control information on one or more secondary frequency bands different from the primary frequency band;
   communicating with the base station through the primary frequency band;
   performing a synchronization procedure with the mobile station through a first secondary frequency band from among the one or more secondary frequency bands;
   in response to the mobile station acquiring synchronization with the first secondary frequency band, transmitting, to the base station through the first secondary frequency band, a readiness indication message indicating that the first secondary frequency band is prepared for a data transmission on the first secondary frequency band based on the control information; and
   receiving, from the base station, a first data signal through the primary frequency band concurrently with a second data signal through the first secondary frequency band in response to transmitting the readiness indication message, the first and second data signals comprising data transmissions for the mobile station.

3. The method according to claim 1, wherein the mobile station is configured to communicate by using the one or more secondary frequency bands based on the control information before preparing the one or more secondary frequency bands.

4. The method according to claim 2, wherein the mobile station is configured to communicate by using the one or more secondary frequency bands based on the control information before preparing the one or more secondary frequency bands.

5. The method according to claim 2, wherein the primary frequency band is always prepared.

6. The method according to claim 2, wherein the primary frequency band is changed by handover.

7. The method according to claim 2, wherein preparing the first secondary frequency band according to the control information received from the base station is performed based on a predetermined time after receiving the control information from the base station through the first secondary frequency band.

8. The method according to claim 2, wherein the mobile station is configured with the one or more secondary frequency bands based on a capability of the mobile station before preparing the one or more secondary frequency bands.

9. A base station capable of managing frequency bands in a wireless communication system, the base station comprising:
   a transceiver configured to:
      transmit, to a mobile station through a primary frequency band, control information on one or more secondary frequency bands different from the primary frequency band,
      communicate with the mobile station through the primary frequency band, wherein the primary frequency band is always allocated,
      perform a synchronization procedure with the mobile station through a first secondary frequency band from among the one or more secondary frequency bands, and
      in response to the mobile station acquiring synchronization with the first secondary frequency band, receive, from the mobile station through the first secondary frequency band, a readiness indication message indicating that the first secondary frequency band is prepared for data transmission on the first secondary frequency band based on the control information; and
   a controller configured to control the transceiver to perform the synchronization procedure through the first secondary frequency band with the mobile station,
   wherein the transceiver is configured to transmit, to the mobile station, a first data signal through the primary frequency band concurrently with a second data signal through the secondary frequency band in response to receiving the readiness indication message, the first and second data signals comprising data transmissions for the mobile station.

10. A mobile station capable of managing at least one frequency in a wireless communication system, the mobile station comprising:
    a transceiver configured to:
       receive, from a base station through a primary frequency band, control information on one or more secondary frequency bands different from the primary frequency band,
       communicate with the base station through the primary frequency band,
       perform a synchronization procedure with the base station through a first secondary frequency band from among the one or more secondary frequency bands, and in response to the mobile station acquiring synchronization with the first secondary frequency band, transmit, to the base station through the first secondary frequency band, a readiness indication message indicating that the first secondary frequency band is prepared for data transmission on the first secondary frequency band based on the control information; and a controller configured to control the transceiver to perform the synchronization procedure through the first secondary frequency band with the base station, wherein the transceiver is configured to receive, from the base station, a first data signal through the primary frequency band concurrently with a second data signal through the first secondary frequency band in response to transmitting the readiness indication message, the first and second data signals comprising data transmissions for the mobile station.

11. The mobile station according to claim 9, wherein the mobile station is configured to communicate by using the one or more secondary frequency bands based on the control information before preparing the one or more secondary frequency bands.

12. The mobile station according to claim 10, wherein the mobile station is configured to communicate by using the one or more secondary frequency bands based on the control information before preparing the one or more secondary frequency bands.

13. The mobile station according to claim 10, wherein the primary frequency band is always prepared.

14. The mobile station according to claim 10, wherein the primary frequency band is changed by handover.

15. The mobile station according to claim 10, wherein preparing the first secondary frequency band according to the control information received from the base station is performed based on a predetermined time after receiving the control information from the base station through the primary frequency band.

16. The mobile station according to claim 10, wherein the mobile station is configured with the one or more secondary frequency bands based on a capability of the mobile station before preparing the one or more secondary frequency bands.

* * * * *